C. H. GIFFORD.
Hay Loader.
No. 69,652. Patented Oct. 8, 1867.
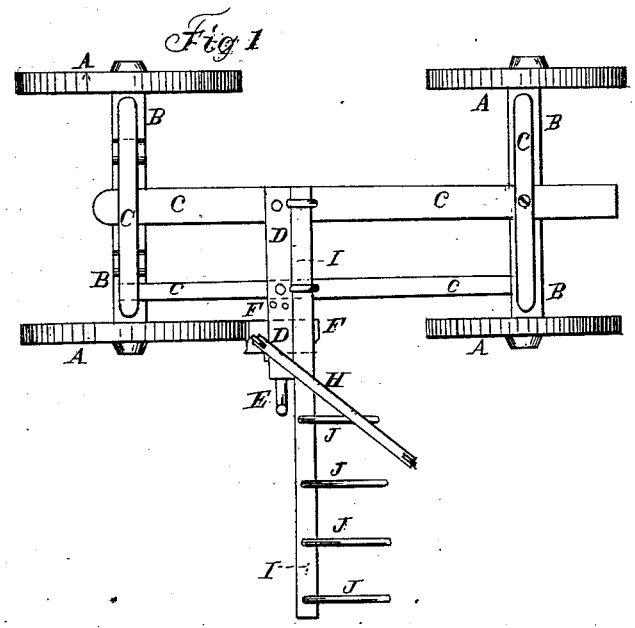
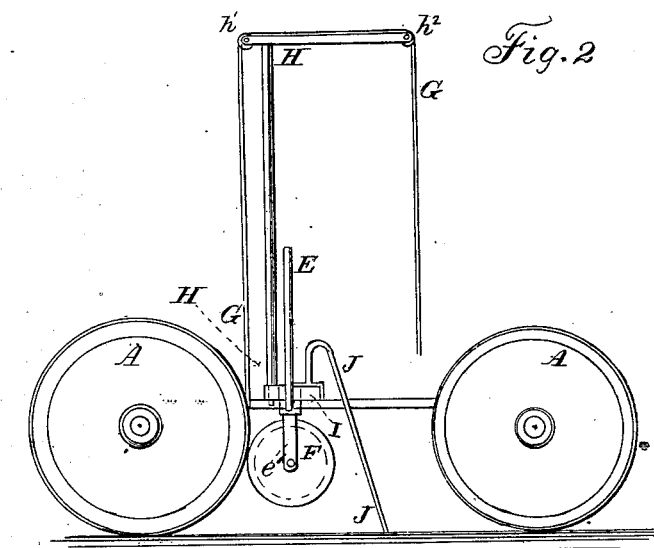

United States Patent Office.

C. H. GIFFORD, OF PHILADELPHIA, NEW YORK, ASSIGNOR TO HIMSELF AND ELBRIDGE SIMS, OF ANTWERP, NEW YORK

Letters Patent No. 69,652, dated October 8, 1867.

IMPROVEMENT IN HAY-LOADERS.

*The Schedule referred to in these Letters Patent and making part of the same.*

TO ALL WHOM IT MAY CONCERN:

Be it known that I, C. H. GIFFORD, of Philadelphia, in the county of Jefferson, and State of New York, have invented a new and improved Hay-Loading Device; and I do hereby declare that the following is a full, clear, and exact description thereof, which will enable others skilled in the art to make and use the same, reference being had to the accompanying drawings, forming part of this specification, in which—

Figure 1 is a top or plan view of my improved device attached to the frame of a wagon.

Figure 2 is a side view of the same.

Similar letters of reference indicate like parts.

My invention has for its object to furnish an improved apparatus by means of which a hay-fork may be easily and conveniently operated for loading hay; and it consists in the combination of the crane, rope, friction-pulley, operating-lever, and supporting-bar with each other and with the frame of the wagon, and in the combination of a rake with the elevating device and with the frame of the wagon, the whole being constructed and arranged as hereinafter more fully described.

A are the wheels, B are the axles, and C is the frame of the wagon. To the frame C is securely attached a bar or beam, D, projecting out at the side of the wagon, as shown in fig. 1. To the under side of the beam D are attached eyes or bearings in which the lever E works. From the lever E two arms, $e'$, one of which is seen in fig. 2, project downward, and in bearings in the ends of which work the journals of the pulley F. The outer end of the lever E is turned upward, for convenience in operating it. By operating the lever E the pulley F is swung against the wheel A, so as to be revolved by the revolution of said wheel. The surface of the end of the pulley F that comes in contact with the wheel A is made flat, as shown in fig. 1, but its outer end is grooved, for the rope G to be wound upon in elevating the fork. In a socket securely attached to the beam D is pivoted the lower end of the upright bar of the crane H, to the upper end of which is solidly attached the horizontal bar of said crane in such a way that its ends may project at unequal distances from said upright, as shown in fig. 2. G is the rope, one end of which is attached to a pulley, F; it then passes up over a pulley, $h^1$, pivoted to the end of the short arm of the horizontal bar of the crane H, and down over the pulley $h^2$, pivoted to the end of the long arm of said bar, and its other end is attached to the hay-fork. I is a beam, attached to the frame of the wagon, from the side of the projecting part of which rake-teeth J descend into such a position as to gather up the hay as the wagon advances. In case the loading is done from a windrow, the rake I J, while one forkful is being raised upon the load, gathers another forkful together ready for the descending fork. And in case the hay is loaded from cocks, it "rakes after," gathering the scattered hay.

In using the apparatus, the fork is loaded, and the projecting end of the lever E operated either by hand or by a rope attached to its upper end. This brings the pulley F in contact with the wheel A, revolving the said pulley, winding up the rope G, and raising the loaded fork, which is swung over the load by turning the crane H.

Having thus described my invention, what I claim as new, and desire to secure by Letters Patent, is—

1. The adjustable friction-pulley F, arranged in journals in the arms C', and adapted to bear against the periphery of the wheel A, as and for the purpose specified.

2. The combination of the crane H, rope G, pulley F, operating-lever E, and beam D with each other and with the frame of the wagon, substantially as herein shown and described, and for the purpose set forth.

3. The combination of the rake I J with the frame of the wagon and with the hoisting apparatus, substantially as herein shown and described, and for the purpose set forth.

C. H. GIFFORD.

Witnesses:
GEO. E. TUCKER,
JOHN E. STRICKLAND